United States Patent [19]
Olshausen

[11] Patent Number: 6,075,597
[45] Date of Patent: Jun. 13, 2000

[54] METHOD FOR COUPLING NARROW-BAND, FABRY-PEROT, ETALON-TYPE INTERFERENCE FILTERS TO TWO-MIRROR AND CATADIOPTRIC TELESCOPES

[76] Inventor: Michael Cohnitz Olshausen, P.O. Box 18653, Washington, D.C. 20036

[21] Appl. No.: 09/270,795

[22] Filed: Mar. 17, 1999

[51] Int. Cl.[7] .................................................... G01B 9/02
[52] U.S. Cl. ......................... 356/345; 356/352; 359/223; 359/224
[58] Field of Search .................................. 356/345, 346, 356/359, 360, 352; 359/223, 224, 847, 848

[56] References Cited

U.S. PATENT DOCUMENTS

| | | | |
|---|---|---|---|
| 4,136,954 | 1/1979 | Jamieson | 356/346 |
| 5,080,490 | 1/1992 | Manhart | 356/359 |
| 5,361,129 | 11/1994 | Dey et al. | 356/359 |
| 5,410,408 | 4/1995 | Evans et al. | 356/359 |
| 5,592,293 | 1/1997 | Garfinkle | 356/359 |
| 5,706,086 | 1/1998 | Lafleur | 356/359 |
| 5,757,493 | 5/1998 | VanKerhove | 356/359 |
| 5,929,992 | 7/1999 | Stenton et al. | 356/359 |
| 5,940,181 | 8/1999 | Tsubono et al. | 356/359 |

*Primary Examiner*—Robert H. Kim

[57] ABSTRACT

A means for examining the sun in monochromatic light in which the separation of the mirrors of either a catadioptric, or pure two-mirror, telescope is altered to produce a virtual object for a converging lens, termed a "forcing lens," this lens being so located between the virtual object and a narrow-band, Fabry-Perot, etalon-type, interference filter, that the convergent beam of light from the telescope passes through the interference filter at a high focal ratio, relative to the telescope's conventional focal ratio, before it traverses the forcing lens, which in turn forms the optical system's only real image, at a different, and much lower, focal ratio. Image contrast is markedly enhanced, relative to the contrast obtained by the same telescope at its conventional focus. By means of a graduated series of entrance pupils, which may be generated by a graduated series of broad-band pre-filters, a step-wise-zoom, constant-contrast, solar monochromator may be constructed. Formulas are provided for parfocalizing a series of forcing lenses. By means of such a series, real-image height may be adjusted, allowing the optimization of an eyepiece/forcing-lens combination for viewing the solar disk and surrounding prominences simultaneously, out to a considerable distance from the solar limb.

19 Claims, 10 Drawing Sheets

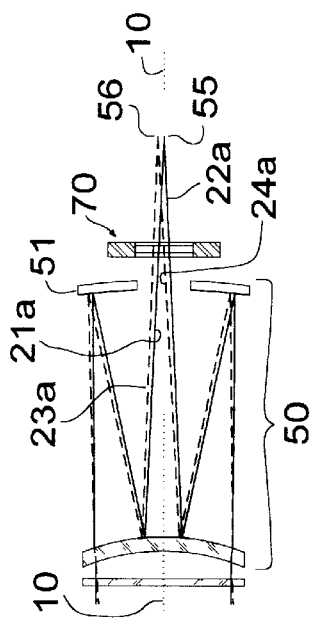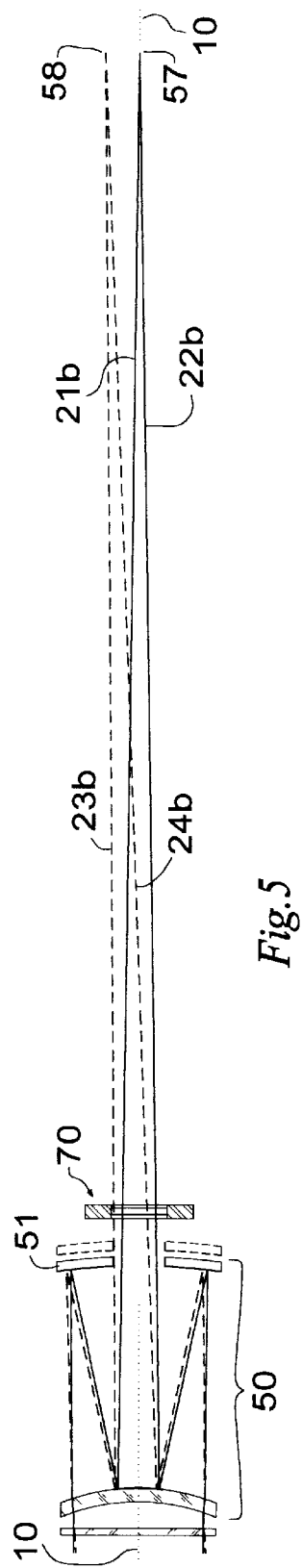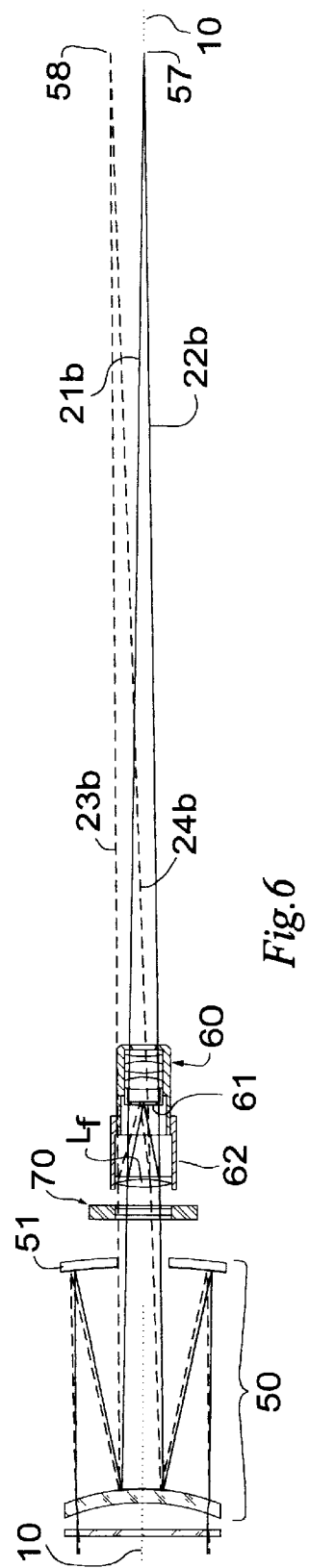

$i_1 + \Delta_1 = i_2 + \Delta_2 \equiv k$

Fig.15 $\quad \Delta_1 = F - \dfrac{f_1 i_1}{f_1 - i_1}$

Fig.16 $\quad \dfrac{h_1}{h_2} = \dfrac{1}{2} \cdot \dfrac{f_1}{f_2} \cdot \left[ \dfrac{F + 2f_2 - k + \sqrt{(k-F)(k-F-4f_2)}}{F + f_1 - \Delta_1} \right]$ Fig.17 $\quad \dfrac{h}{H} = \dfrac{2f}{F + 2f - k + \sqrt{(k-F)(k-F-4f_2)}}$ Fig.18 $\quad \Delta_2 - \Delta_1 = \dfrac{k - F - \sqrt{(k-F)(k-F-4f_2)}}{2} + \dfrac{f_1 i_1}{f_1 - i_1}$ Fig.19 $\quad k = F - \dfrac{i^2}{f - i}$

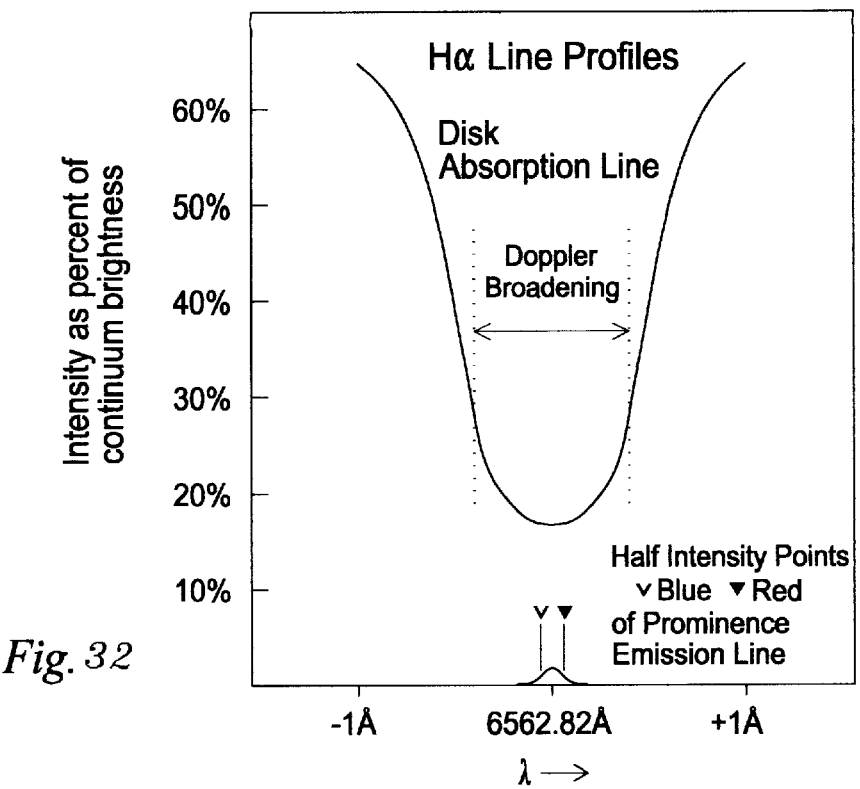
Fig. 32
$$\Delta \lambda = \lambda \frac{\theta_i^2}{2\eta}$$
Fig. 33
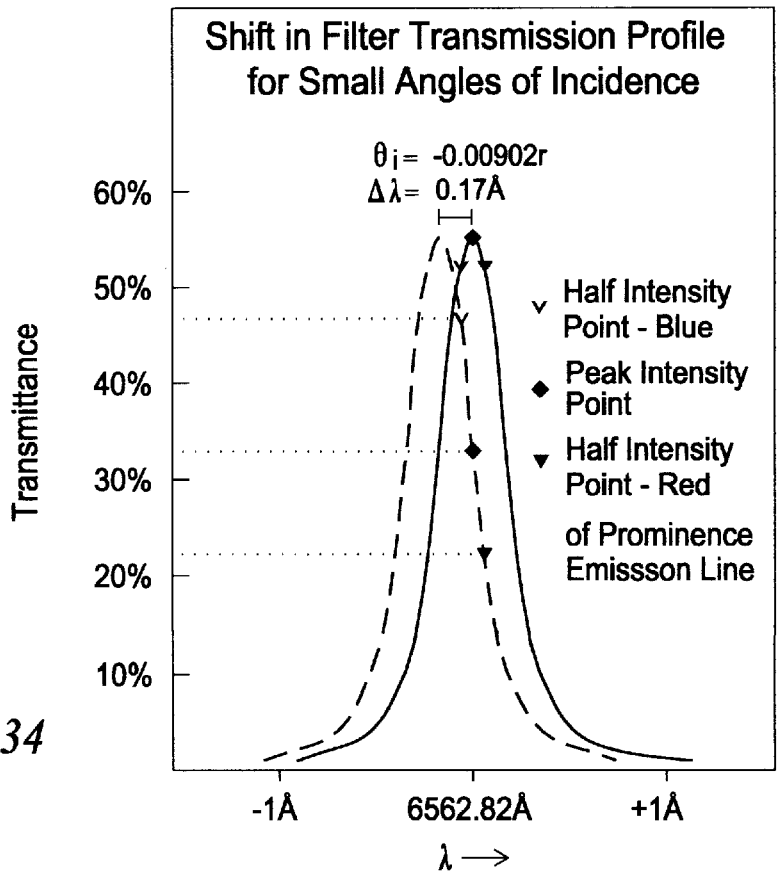
Fig. 34

METHOD FOR COUPLING NARROW-BAND, FABRY-PEROT, ETALON-TYPE INTERFERENCE FILTERS TO TWO-MIRROR AND CATADIOPTRIC TELESCOPES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to interference filters, in particular to narrow-band, Fabry-Perot, etalon-type, interference filters, and to the coupling of such filters to the members of a class of telescopes. Each member of this class is characterized by a primary mirror with a perforation therein and by a secondary mirror that partially obstructs light-rays from striking this primary mirror. The secondary mirror redirects those light rays that have fallen upon the primary mirror, and have begun to converge, to a conventional focus, through the aforesaid perforation. The telescope's conventional focus thus is located on the side of the primary mirror farthest from the secondary mirror and is furthermore located close-enough to this rear side that the telescope's drawtube, into which various eyepieces or a CCD and/or a diagonal mirror may be inserted, is not overly long. A narrow-band interference filter is a filter whose half-bandwidth is, in order of magnitude, similar to the shift in the filter's peak, transmitted wavelength that is occasioned by a small departure from normal incidence of a beam of light incident upon and filtered by it. Half-bandwidths of less than 0.6 Å are quite commonly used by amateur observers to watch filaments and flares on the sun's disk, as well as prominences originating in the sun's low chromosphere and expanding into the corona. Most often, although not always, such narrow-band filters are centered on the deep-red wavelength at which the hydrogen atom, at rest with respect to the observer, emits and absorbs light, at 6562.8 Å. Known as H-alpha, or Hα, this spectral line appears as a broad absorption feature in the spectrum of the solar disk. The broadening of the line results from random, thermal motions of the absorbing atoms, from turbulent motions of the gases containing them, and in part from collisions with nearby atomic species, a broadening dominated by the Stark effect. By contrast, the luminous, gossamery prominences seen at the sun's limb display the Hα-line in emission only, and the line's width, due nearly entirely to thermal, or Doppler, broadening, is generally much narrower than the broad, disk absorption line. Because the prominences—which appear through a narrow-band filter as bright objects against a black background—re-radiate and scatter light emerging radially outward from the photosphere below them, and because they do this into all solid angles, and further because they are generally cooler than the photosphere, they appear, in Hα, to be much fainter than the solar disk. The average, quiescent prominence appears to radiate with an intensity equal to only about 10% the intensity of the residual, Hα emission—known as the "continuum"—of the underlying photosphere. This residual, photospheric, or continuum emission, observed as it escapes from among and between the overlying absorption features of the chromosphere is what gives to the sun's disk in Hα its mottled and gnarled appearance.

The intensity relations just described are depicted in FIG. 32. For the Hα absorption-line profile shown in FIG. 32, see, for example, *The Quiet Sun*, by Edward G. Gibson, Manned Space-craft Center, NASA, Houston, Tex.; U.S. Government Printing Office, Washington, D.C., 1973, p. 147. For a qualitative discussion of prominence, spectral, line widths, see, for example, *Astrophysics of the Sun*, by Harold Zirin, Cambridge University Press, New York, 1988, pp. 264–265.

To increase the contrast of the Hα-absorption features observed against the underlying, continuum emission over the sun's disk, an interference filter with the narrowest possible half-bandwidth—admitting the least continuu emission—becomes greatly desirable. It is desirable also, however, to be able to view the entire solar disk plus prominences out to a distance of about 1 solar radius from the sun's limb all at once, the better to be able to survey for, and to follow, interesting activity. This in turn entails viewing an area on the sky with an angular diameter of about 1 degree, the sun, like the moon, subtending an average, angular diameter of about half a degree.

Any telescope that images an extended area such as this necessarily sends converging rays of light to points on an extended image surface, each point of which is actually the focus of a unique cone of light rays. To say that there is a cone, however, implies that there is a certain spread of ray-angles contained within the cone's apex angle, each of which contributes to the illumination of the given point.

This circumstance causes a problem only when a narrow-band, Fabry-Perot, etalon-type interference filter is interposed into the convergent cone, because the filter's peak, transmitted wavelength shifts as a function of the cosine of the angle of incidence of any light-ray falling upon it. For small angles of incidence, this shift is proportional to the square of the angle, expressed in radians (see FIGS. 33 and 34). The focal-ratio of the telescope and the height above the optical axis of the image-point determine the spread of angles within the cone converging toward that point. Each ray within the cone will have, as the ray passes through the interference filter, its own, particular, peak-transmission wavelength, different from the rest-wavelength of interest. Hence, the illumination of each point in the image, made up of many such contributions, together forming the envelope that is the filter's transmission profile at the point, will not be monochromatic. It will contain light coming not only from the center of the spectral line, but it will also contain varying amounts of emission from the neighboring continuum, as well. The faster the imaging system—i.e. the smaller the focal-ratio, or more spread-out the light cones—the more serious this problem becomes.

If the focal ratio is decreased too far, the filter may allow such a large quantity of radiation to enter the detector (the eye, a CCD camera, etc.) from the continuum bordering the absorption line of interest, that all contrast will be lost and few, if any, absorption features will be observed.

Solutions to this image-contrast problem come essentially in two flavors. In the plain-flavor solution, the telescope's focal ratio is increased in one of two ways. Either its aperture D is stopped down, or a negative lens is placed on the optical axis between the telescope's objective and the filter, in order to increase the telescope's effective focal length F.

Aperture reduction is the most-commonly used method among amateur observers, since it requires nothing more than the placing of a sub-diameter stop over the aperture of the telescope—axially for common refractors, or off-axis for such popular catadioptrics as the Meade and Celestron Schmidt-Cassegrains, and the Questar and INTES Maksutov-Cassegrains, among many others. Since a narrow-band, Hα filter must be preceded by a broad-band filter, commonly known as an energy-rejection pre-filter, if it is to be exposed to the sun's energy concentrated in a telescope, such pre-filters are sold in a variety of sub-diameter versions, each sized to obtain a minimum f/30 focal ratio for a given make and aperture of telescope. The pre-filter thus acts as an aperture stop, thereby defining the entrance pupil of the telescope. In the case of catadioptric telescopes, this pre-filter is placed closely adjacent to the refracting element—a meniscus lens in the case of Maksutov-Cassegrains, an afocal correcting plate in the case of Schmidt-Cassegrains—on the side of the element farthest from the primary mirror.

Observation through a narrow-band, Fabry-Perot, etalon-type interference filter does not invariably require an energy-rejection pre-filter, however. Interference filters centered, for example, on the rest wavelength of the Fraunhofer K line, one of the doublet lines of singly ionized Calcium, and the broadest line in the visible, solar spectrum, at 3933.7 Å, require no such pre-filter. In these cases, the entrance pupil of the telescope may be reduced by placing an aperture stop as close to the secondary mirror as the construction of telescope will allow and on the side of the secondary mirror farthest from primary mirror.

One serious disadvantage of aperture-reduction as a means for enhancing contrast is that, with increasing magnification of the image, less and less light becomes available per unit solid angle entering the eye—the aperture D being fixed—so that the sun's image actually appears faint. High-power contrast notably deteriorates. At low levels of illumination, the human eye has increasing difficulty resolving even very contrasty detail, as we are reminded whenever we try to read, in a dimly-lit room, black print on a book's white pages. Furthermore, aperture-reduction has no effect on image scale in the focal plane. If the telescope has a long focal length, the entire solar disk may simply be difficult to accommodate within the field-stop of a standard, "low power" eyepiece, not to mention accommodating the surrounding prominences. At 1.13 inches in diameter for every 120 inches of focal length, the sun's disk is, by itself, 1.03 inches across at the conventional focus of a 11" f/10 Schmidt-Cassegrain telescope.

The image-contrast problem may also be addressed by increasing the telescope's focal ratio by means of a negative lens placed in the path of the converging beam, thereby narrowing it and increasing the telescope's effective focal length. This method is occasionally used with slow, f/15 refractors, but it has the disadvantage of increasing the telescope's length, cramping portability. Furthermore, since the aperture D remains fixed, high-power contrast once again deteriorates. The image-scale problem arises again, too, aggravated now by the increase in F.

The spicy-flavor solution to the image-contrast problem involves the use of a so-called telecentric relay, in which light from an imaging objective is first brought to a focus, then is collimated by a lens, next is passed through the narrow-band, Fabry-Perot, etalon-type interference filter, and then is reimaged by a second lens, usually symmetric to the first, optically, whereupon the solar image may be viewed through an eyepiece or reimaged once again through a microscope objective. U.S. Pat. No. 5,125,743 integrates exactly such an optical path, albeit with sophisticated elaborations, into a solar magnetograph. For an in-depth discussion of such telecentric systems, see, for example, *The Effect of Telecentric Use of Narrow-Band Filters on Diffraction Limited Imaging* by Jacques M. Beckers, National Solar Observatory/NOAO, Tucson, Ariz., and Sunspot, N.M.; paper presented at the SPIE [Society of Photo-optical Instrumentation Engineering] Conference 3355 on Optical Astronomical Instrumentation, Mar. 26–28, 1998.

Commercial, telecentric systems, either integrated into refracting, solar-dedicated telescopes or sold as accessories to the owners of high-end, general-use, refracting telescopes, have been available for some time. These systems, however, all share the contrast deterioration problem at high power outlined above, since both D and F remain fixed, and may share the image-scale problem, if F is large and the relay's lenses are symmetric.

A primary object of the present invention is thus to provide a means for solving the high-power, image-contrast problem, and in fact to provide a means that accommodates a range of image-magnifications, offering at each magnification an image to view that is sufficiently bright as to preserve maximum contrast, and that furthermore solves the whole-disk-plus-surrounding-prominences, image-scale problem, and that accomplishes these useful objectives for a broad class of telescopes, both commercial-grade and professional.

BRIEF SUMMARY OF THE INVENTION

The present invention builds upon the ability of two-mirror telescopes, of such various types as the catadioptric Maksutov-Cassegrains and Schmidt-Cassegrains, or the pure-two mirror Cassegrains, Gregorians, or Ritchey-Chretiens, to project an image not merely behind their primary mirrors, but very far behind their primary mirrors. Such "back focus" generally is achieved by making only relatively minor adjustments in the distance separating the telescopes' mirrors. Even quite small telescopes, such the Questar Corporation's 3.5-inch Maksutov, patented in the 1950's by Lawrence E. Braymer, can produce images whose quality remains strikingly good out to as much as a meter of back focus, though the telescope itself is only ¼-meter long. More importantly, however, the effective focal length and, hence, the effective focal ratio of these systems often may be increased by a factor of up to three, or more, with little or no vignetting of the primary mirror. The convergent cone of light may be made quite narrow, indeed.

The present invention takes a narrow-band, Fabry-Perot, etalon-type interference filter and places it in this extended, convergent cone, and then places a converging lens immediately behind the filter and at a fixed distance from a desired image plane, typically the field stop an eyepiece, the aforesaid fixed distance being, furthermore, only slightly less than the focal length of the converging lens. This combination of converging lens plus fixed distance from the image plane has the effect of forcing the telescope—by movement of one of its mirrors—to produce such a narrow, convergent cone of light that an image actually may be brought to a focus at this fixed distance. The resulting image, though much smaller than the image the telescope would have formed at its conventional focal plane, and although very much smaller than the image that would be formed at the extended back focus, were the narrow cone of light actually to be brought to a focus there, has been made very rich in high-contrast detail. All that is now required to view this detail is a series of very short-focal length eyepieces, say 8 mm. or less. Short-focal length eyepieces such as these, however, usually are too powerful to be profitably employed, given the image-distortions that daytime heating and atmospheric turbulence typically produce at high magnification. But now that the image itself has been reduced in scale, the magnifications developed by such eyepieces in examining this image are still not overly high. Ultra-short focal length eyepieces—some as short as 2.5 mm—have become available with eye reliefs as long as 20 mm that are eminently-well suited to the present purpose.

By simultaneously contrast-enhancing and scaling-down the image, joint observation of the sun's disk and its prominences is made possible with eyepieces of quite-standard diameter and mid-range focal length, say 18 to 24 mm. Furthermore, pre-filters of greatly increased aperture may be used, inasmuch as the focal ratio experienced by the interference filter, as distinguished from the focal ratio experienced at the eyepiece, has now been increased, so that, even at full aperture, the "filter-experienced" focal-ratio is not less than about f/36. Thus, it becomes possible to match pre-filter aperture to eyepiece focal length, and so to achieve a graduated series of views, each at a graduated level of magnification and at a sufficient and corresponding, graduated level of illumination to disclose the contrasty detail actually present in the small, real image.

The present inventor is the designer of the Questar Corporation's dual-aperture pre-filter, marketed by Questar since 1991. The dual-aperture pre-filter has one aperture that is small and off-axis, and another, larger aperture that is on-axis, and therefore concentric with the telescope's centrally-obstructing, secondary mirror. This on-axis pre-filter is about two and a half times the off-axis, pre-filter diameter, though it is still well-under the full diameter of the telescope's meniscus lens. The one serious drawback of the dual-aperture pre-filter has always been that Hα views of the solar disk through the larger, on-axis aperture, although sufficiently bright, have offered too-little contrast. They have always seemed a little "muddy". This is because the system's focal plane was not extended appreciably beyond the telescope's conventional, f/14 focus. The focal-ratio thus experienced by the interference filter when illuminated by the on-axis pre-filter is about f/20: too fast for good, disk contrast. The on-axis aperture therefore has been primarily useful for observing prominences, and not the solar disk. The present invention remedies this defect.

U.S. Pat. No. 4,768,869 discloses a catadioptric imaging system in which the separation of the mirrors of the system's telescope is such as to render the light-beam produced by them afocal, that is, collimated, so that, in effect, an infinite back focus is achieved. This device, however, does not interpose an interference filter into any convergent beam, nor does it place a converging lens behind such a filter for the purpose of narrowing a convergent beam so that it approaches collimation.

U.S. Pat. No. 4,235,508 discloses a catadioptric imaging system that includes a telescopic component, but it locates this component's primary, real image at a point in front of, rather than behind, the component's primary mirror. Furthermore, it reimages a diverging beam. Apart from passage through a symmetrical relay, the apex angle of the cone of light exiting the telescopic component is not narrowed in any way.

U.S. Pat. No. 3,580,679 discloses an imaging system that contains a two-mirror telescope which forms that imaging system's first real image at a point behind the telescope's primary mirror yet prior to the passage of any light through the system's interference filters. The device then passes a plurality of diverging beams through a like-numbered plurality of filters, whereupon it forms a plurality of second, real images. The device makes no attempt to modify the internal angles of the diverging cones of light formed by its telescopic component before these light-cones pass through the system's narrow-band, interference filters. As lines 9–13 of column 7 make apparent, this system is of the aperture-reduction type, discussed above. It is neither capable of solving the high-power, image-contrast problem, nor of solving the whole-disk-plus-surrounding-prominences, image-scale problem, outlined above.

With the foregoing in mind, it is an important object of the present invention to provide a method for enhancing the contrast of a substantially monochromatic image of the sun over the contrast that would be obtained through aperture-reduction of the image-forming means.

It is a further object of the present invention to provide a means for enabling an image of the sun to be viewed at various magnifications in substantially monochromatic light, with sufficient illumination at each magnification to disclose the enhanced-contrast detail present in the image.

It is a further another object of the present invention to provide formulas by means of which to adjust the size of the monochromatic, solar image brought to a focus at the field stop of an eyepiece.

It is yet another object of the present invention to provide an optical system capable of imaging the sun in substantially monochromatic light, such that both the sun's disk and prominences may be viewed at once through a standard-diameter eyepiece.

Still-further objects and significant advantages of the present invention will become apparent from a consideration of the following, detailed specification, appended claims, and drawings.

BRIEF DESCRIPTION OF THE SEVERAL VIEWS OF THE DRAWING

Referring to the drawings, wherein like reference characters indicate like parts or elements throughout the several views, and wherein arrowheads indicate physically-composite objects whose numbered resolution into constituent parts occurs only when it is germane to the discussion:

FIG. 4 is a cross-sectional view of a portion of the optical system shown in FIG. 3 in the same plane and showing both axial and off-axis, conventional focal points.

FIG. 5 is a cross-sectional view of the optical system shown in FIG. 4, in the same plane, but showing non-conventional, axial and off-axis focal points.

FIG. 6 is a cross-sectional view of the optical system shown in FIG. 5 in the same plane and with the present invention located in the optical system's convergent beam.

FIG. 15 is an equation.

FIG. 16 is an equation.

FIG. 17 is an equation.

FIG. 18 is an equation.

FIG. 19 is an equation.

FIG. 32 is a graph.

FIG. 33 is an equation.

FIG. 34 is a graph.

DETAILED DESCRIPTION OF THE INVENTION

Figure 1:
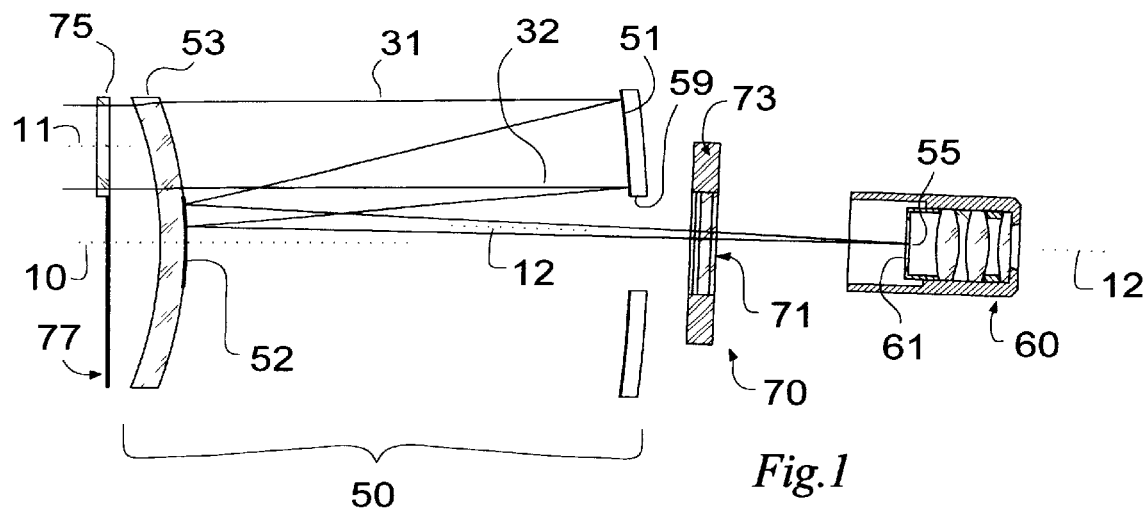
FIG. 1 is a cross-sectional view of an optical system in a plane containing the optical axis and a diameter of each optical component and showing the conventional, axial focal point.

FIG. 1 shows representative two-mirror telescope 50, having first-surface, primary mirror 51 and first-surface, secondary mirror 52. Mirror 52 is shown deposited on the rear of meniscus lens 53, so that telescope 50, for specificity's sake, has been drawn as a variety of Maksutov-Cassegrain catadioptric. A different, but similar, two-mirror telescope, say with a Mangin-type secondary, would serve the illustrative purposes of this specification equally well. The optical elements of telescope 50 are located on axis 10, about which they are rotationally symmetric. To the left of, that is in front of, meniscus 53 is off-axis, broad-band pre-filter 75, with axis of symmetry 11 parallel to 10. The diameter of pre-filter 75 is typically chosen to be half the difference in diameter between meniscus lens 53 and secondary mirror 52, since the latter centrally obstructs the former. Pre-filter 75 is held by plate 77 whose exact construction is not germane to the present discussion. Light rays 31 and 32 pass through pre-filter 75 near its periphery and parallel to axis 11 and enter telescope 50, from which they emerge through perforation 59 in mirror 51. Since rays 31 and 32 enter telescope 50 off-axis, the axis 12 of their convergent cone is no longer parallel to axis 10. Behind, that is to the right of, mirror 51 and perpendicular to axis 12 is narrow-band, Fabry-Perot, etalon-type interference filter 70, comprising filter-stack 71 and housing 73. In general, filter-stack 71 comprises a Fabry-Perot etalon and a number of blocking filters both in front of, and behind, the etalon. The exact construction of such filter-stacks varies somewhat from manufacturer to manufacturer, particularly with regard to the index of refraction of the etalon and the transmittances and reflectances of the thin, metallic films deposited thereupon, and is not germane to the present discussion. What is essential and is common to all such Fabry-Perot, etalon-type, narrow-band interference filters is that the wavelengths at which they transmit light depend in a complicated, but well-known, manner on the angle of incidence of the light rays incident upon and passing through them, as well as on filter-stack temperature. For a comprehensive, theoretical discussion of such filters, see *Thin-Film Optical Filters*, by H. A. Macleod, American Elsevier Publishing Company, New York, 1969. Housing 73 contains, as a rule, a heating element by means of which filter-stack 71 is maintained at constant temperature. Constant filter temperature is assumed throughout this discussion. Rays 31 and 32 are brought to a conventional focus at point 55, which, given that pre-filter 75 is off-axis, is where axes 12 and 10 intersect. Field stop 61 of eyepiece 60 is centered on point 55. Eyepiece 60 is tilted so that its axis coincides with axis 12, thereby rendering the plane of field stop 61 parallel to the plane of filter stack 71, and bringing their respective centers into registry.

Figure 2:
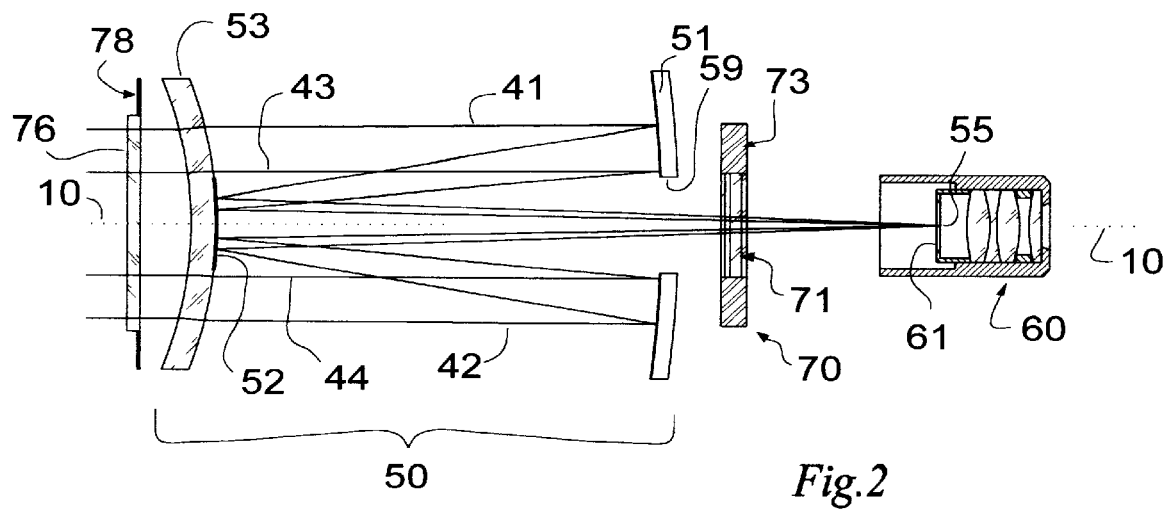
FIG. 2 is a cross-sectional view of a second, and similar optical system in a plane containing the optical axis and a diameter of each optical component and showing the conventional, axial focal point.

FIG. 2 repeats telescope 50 but precedes it with sub-diameter, axial pre-filter 76 supported by plate 78. Ray 41 passes through pre-filter 76 at its top periphery, and ray 43 passes through pre-filter 76 at a point near the top periphery of secondary mirror 52 as projected forward onto pre-filter 76. Secondary mirror 52 obstructs pre-filter 76 just as it does primary mirror 51. Rays 42 and 44 are symmetric to rays 41 and 43 with respect to axis 10, that is, they enter below obstructing mirror 52 in this cross-section. Because all of the ray paths are now symmetric with respect to axis 10, filter 70 is located perpendicular to axis 10, but otherwise in the same location as in FIG. 1. The spatial relationship of eyepiece 60 with respect to filter 70 is the same as in FIG. 1.

Figure 3:
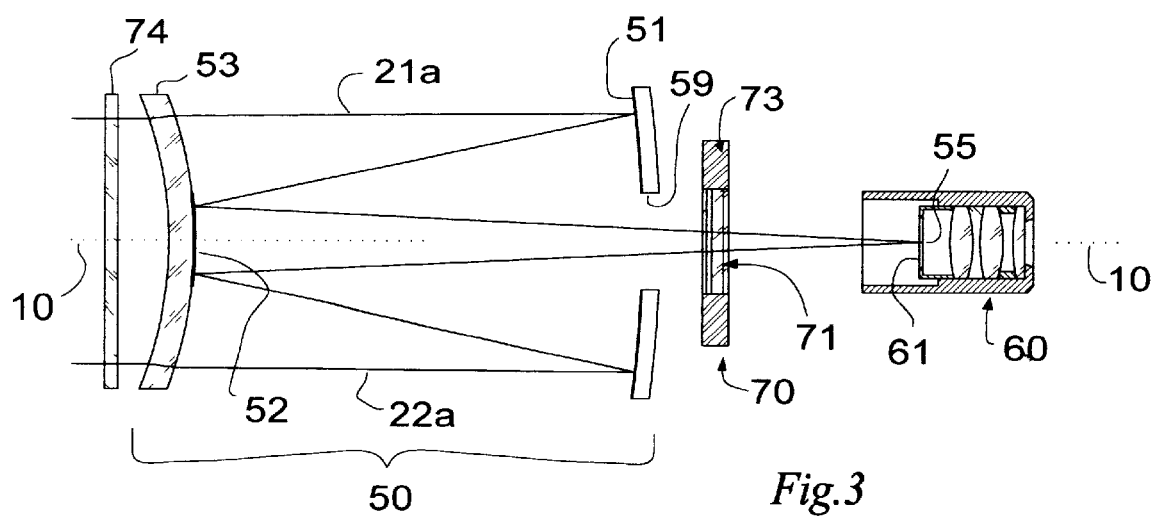
FIG. 3 is a cross-sectional view of a third, and similar optical system in a plane containing the optical axis and a diameter of each optical component and showing the conventional, axial focal point.

FIG. 3 repeats telescope 50, but precedes it with full-aperture pre-filter 74. Rays 21a and 22a enter pre-filter 74 near its top- and bottom-periphery, respectively, and come to a focus, as in FIGS. 1 and 2, at point 55. The spatial relationships among eyepiece 60, filter 70, and telescope 50 are the same as in FIG. 2.

FIG. 4 shows the optical arrangement of FIG. 3, but omits eyepiece 60 and adds a set of rays 23a and 24a, shown dashed, entering obliquely to optical axis 10 and coming to a focus at point 56 in the conventional focal plane and just above axis 10.

FIG. 5 shows the optical arrangement of FIG. 4, except that now primary mirror 51 has been moved forward from its conventional position, shown dashed. This movement or mirror 51 has the effect of translating conventional focal points 55 and 56 to unconventional, back focal points 57 and 58, respectively. Rays 21*b* and 22*b* converge to point 57; rays 23*a* and 24*a* converge to point 58. FIG. 5, which was generated by computer, accurately shows this translation for the radii and refractive index assumed for the elements of telescope 50.

FIG. 6 shows the optical arrangement of FIG. 5 but with the present invention added. Eyepiece 60 is shown connected to housing 62, wherein forcing lens $L_f$ is held. The effect of forcing lens $L_f$ will be examined in detail below, but one can see already that axial rays 21*b* and 22*b* and off-axis rays 23*a* and 24*a* have been brought to their respective foci at field stop 61 of eyepiece 60, having however first passed through filter 70 nearly perpendicularly. The extended back foci now belong to the virtual object of forcing lens $L_f$.

Figure 7:
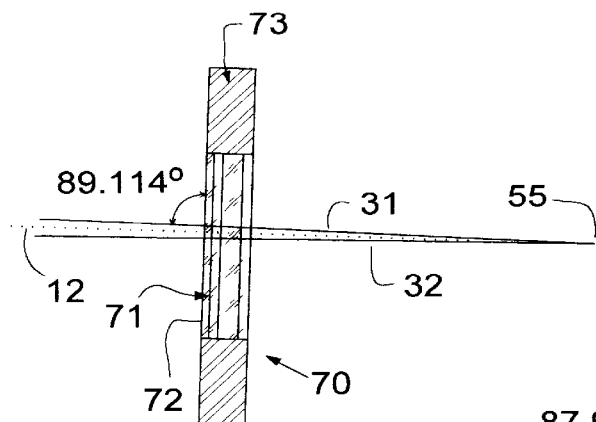
FIG. 7 is an enlarged, cross-sectional view of an optical element of FIG. 1, in the same plane.
Figure 8:
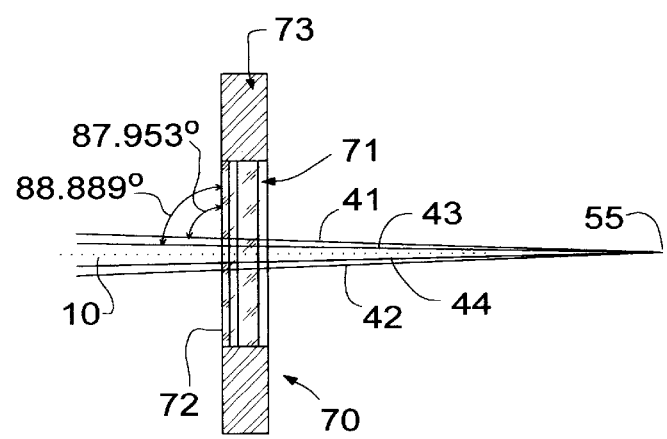
FIG. 8 is an enlarged, cross-sectional view of an optical element of FIG. 2, in the same plane.
Figure 9:
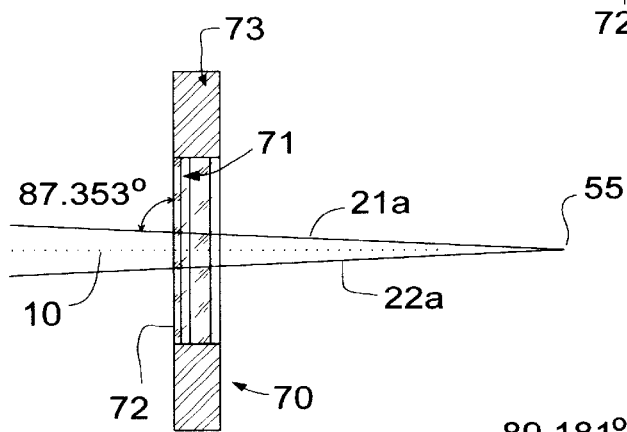
FIG. 9 is an enlarged, cross-sectional view of an optical element of FIG. 3, in the same plane.
Figure 10:
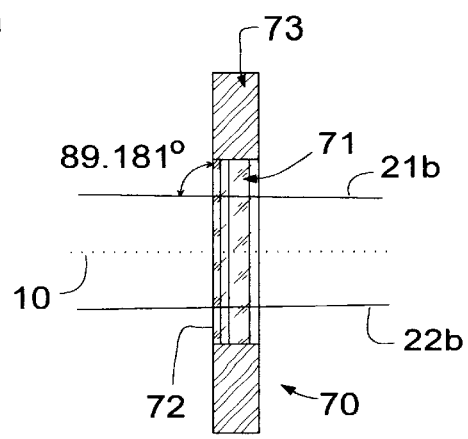
FIG. 10 is an enlarged, cross-sectional view of an optical element of FIG. 6, in the same plane.

FIGS. 7, 8, and 9, show filter 70 enlarged in scale but in the same relation to the cones of light that converge to conventional focus 55, shown, respectively, in FIGS. 1, 2, and 3. FIG. 10 shows filter 70 enlarged in scale and in the same relation to the cone of light defined by rays 21*b* and 22*b*, which, in FIG. 5, converge to unconventional focus 57. For the heuristic purpose served here, only short segments of lights rays 21*b* and 22*b* need be shown. In FIGS. 7 through 10 the angles of incidence of the sample rays incident upon filter 70 are indicated by their complements, for the sake of graphic clarity, it being rather difficult to resolve the normal to 70 from the incident light-rays themselves for such small angles of incidence, on such small figures. The complementary angles have been measured by the CAD program used to generate the figures, and are rounded only in the last decimal place.

It is immediately apparent that, of the optical arrangements shown in FIGS. 7, 8, and 9, the arrangement of FIG. 7 produces the least largest angle of incidence on filter 70. But it is also apparent that, of all four optical arrangements, the arrangement of FIG. 10 produces the least largest angle of incidence on filter 70 of them all, and that it does this, furthermore, for a full-aperture pre-filter. If, now, an off-axis pre-filter were to be used instead, in the manner of FIG. 1, then the resulting slope of any ray passing through filter 70 would be so slight as to render the converging cone of light, of which the ray is a part, a close-to-perfect simulation of collimated light. In fact, its corresponding focal-ratio would nearly treble the focal-ratio corresponding to FIG. 10.

It is further immediately apparent that, under conventional circumstances, axial, sub-diameter pre-filter 76 of FIG. 2 is particularly disadvantageous, inasmuch as those paraxial rays which might otherwise pass through filter 70 at very low angles of incidence are exactly the rays obstructed by secondary mirror 52. The smaller pre-filter 76, the greater will be the proportionate effect of this omission. One of the significant advantages of the present invention is that it redirects rays 41, 43, 42, and 44 from sub-diameter pre-filter 76 in such a manner that these rays become even-more nearly collimated than rays 21*b* and 22*b* of FIGS. 6 and 10, which rays are themselves more-nearly collimated than rays 31 and 32 of the conventional, off-axis arrangement shown in FIG. 1. That is to say, the present invention enables the use of a range of diameters for both axial and off-axis pre-filters, in each case enabling the interference filter to exceed its best performance in any of the conventional arrangements, i.e. to experience far-smaller shifts of its peak transmission wavelength over the field of view.

Figure 11:
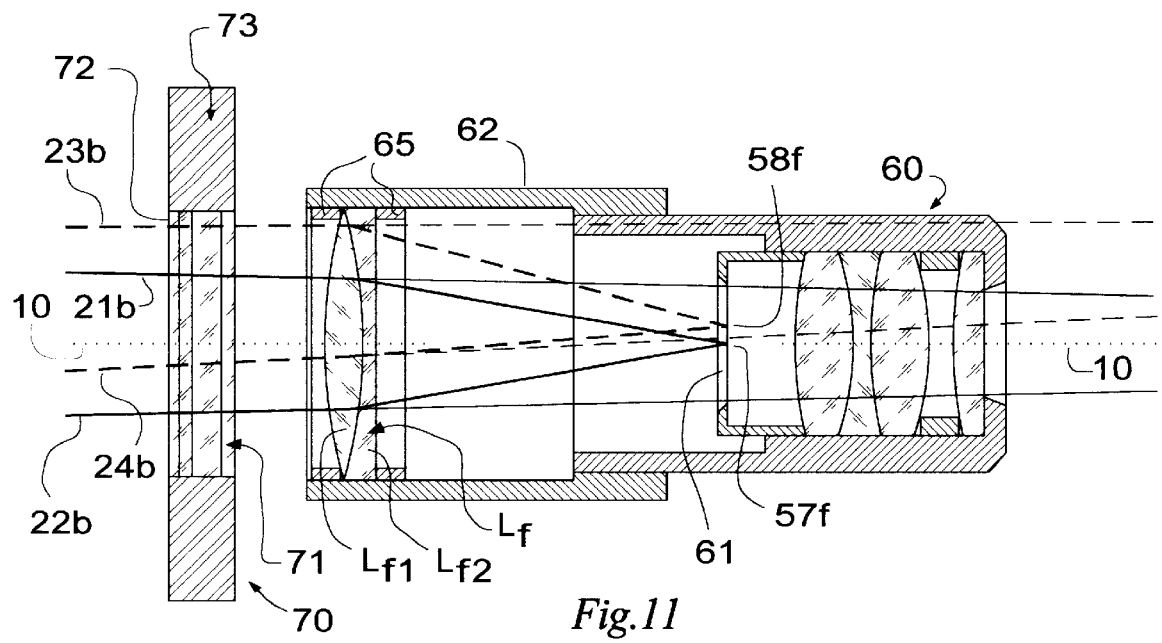
FIG. 11 is an enlarged, cross-sectional view of a portion of FIG. 6, showing one embodiment of the present invention.

FIG. 11 is an enlarged view of the present invention, as shown in FIG. 6, showing off-axis focal point 58*f* produced by rays 23*b* and 24*b* (shown bold), and axial focal point 57*f* produced by rays 21*b* and 22*b* (shown bold), as redirected by forcing lens $L_f$. Points 58*f* and 57*f* lie in the plane of field stop 61 of eyepiece 60. Forcing lens $L_f$ is shown in housing 62, held in place by retaining rings 65. Filter stack 71 is shown perpendicular to axis 10, with which both it and eyepiece 60 are co-axial. Rays 21*b*, 22*b*, 23*b*, and 24*b* pass through filter stack 71 at a very small angles of incidence, and, once past filter 70, are bent by forcing lens $L_f$ so that they converge to what is now the first, and only, real image produced by the optical system. If rays 21*b*, 22*b*, 23*b*, and 24*b* were not first met by forcing lens $L_f$, and if eyepiece 60 were removed, they would come to foci 57 and 58, respectively, shown in FIG. 5. But this does not occur, and the foci 57 and 58 remain virtual. Thus, it may be said that the present invention induces a primary focus that has two, different focal ratios, and that, furthermore, the most significant optical element of the overall system, namely filter stack 71, experiences only the longer of these focal ratios, while eyepiece 60, experiences the shorter.

FIG. 11 also demonstrates that, for each point in the image formed at field stop 61, the surface area of filter-stack 71 through which light has had to pass to arrive at that image point is substantially greater than the surface area of filter-stack 71 that would have been intercepted by a light-cone converging to the conventional focal plane. This can be immediately seen by comparing FIG. 10 with any of FIGS. 7 through 9. Imperfections in filter-stack 71, such as patches of high transmittance, are thus averaged substantially-more effectively by the present invention than by any of the conventional arrangements shown in FIGS. 1 through 3. Images captured electronically or photo-graphically will thus be more evenly illuminated.

Figure 12:
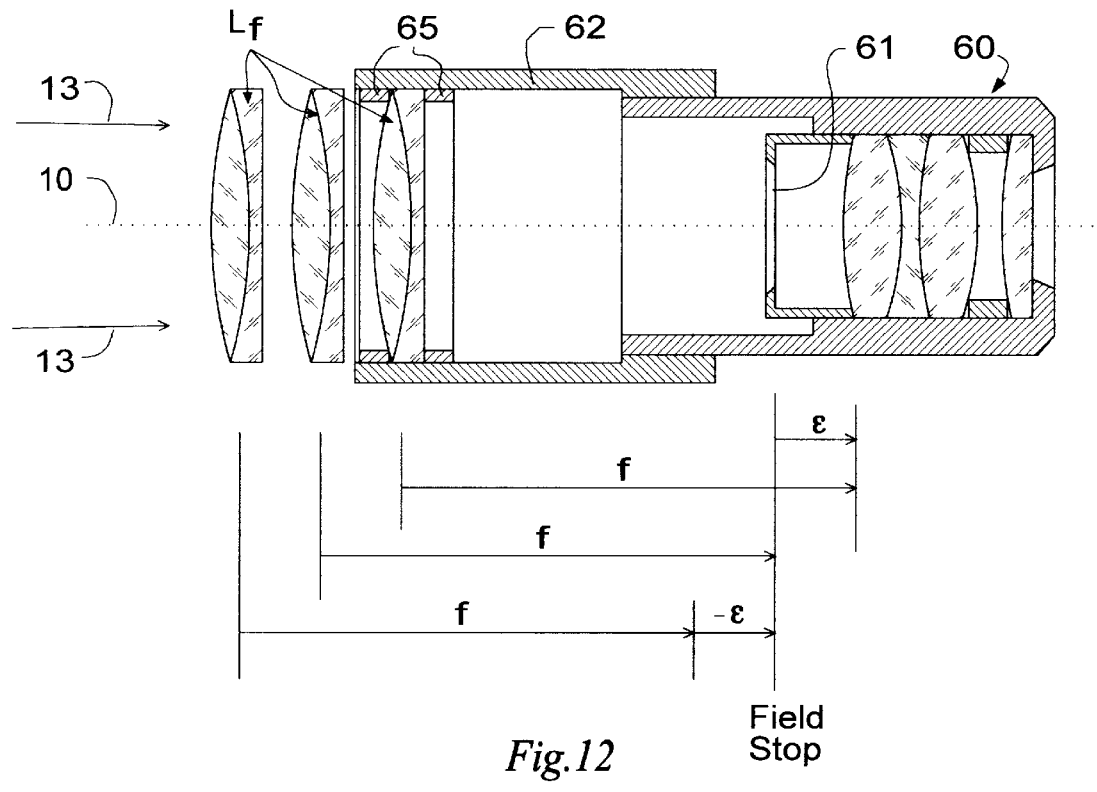
FIG. 12 is a cross-sectional view of a portion of the embodiment shown in FIG. 11, and showing alternate positions for the converging lens thereof.

FIG. 12 shows generally convergent light rays 13 about to pass through forcing lens $L_f$ of the present invention, with forcing lens $L_f$ shown in three, possible locations, described by focal length f of forcing lens $L_f$ for an infinite object, and by the parameter $\epsilon$, the distance between the focal plane of $L_f$ and field stop 61 of eyepiece 60. If $\epsilon$ is negative, already-converging rays 13 will be brought to a focus ahead of field stop 61, since forcing lens $L_f$ causes still further convergence. If $\epsilon=0$, rays 13 still will not be brought to a focus at field stop 61, because, again, they are convergent to begin with. For $\epsilon=0$, rays 13 would have to be perfectly parallel, i.e. the light-beam comprising them would have to be collimated, to come to a focus at field stop 61. If $\epsilon>0$, however, there will always be some slope, however slight, for rays 13 that will enable them to be brought to a focus at field stop 61. There will be some, adjustable distance between mirrors 51 and 52 of telescope 50 that will suffice to effect such a focus. (For pure, two-mirror telescopes, the equations relating mirror separation and back focus may be found in *Modern Optical Engineering: The Design of Optical Systems*, Warren J. Smith, McGraw Hill, New York, 1990, 2nd edition, pp.440–441.) Thus, as $\epsilon \to 0$ from above, rays 13 must be made ever-more nearly collimated, that is, their slope must tend to 0 and their corresponding focal ratio must tend to $\infty$, if an image is to form at field stop 61. Conversely, for any focal length f of forcing lens $L_f$ and for any slope for rays 13 between 0, for true collimation, and their slope at the conventional focus, there will be some $\epsilon$ in the open interval (0,f) such that an image will form at field stop 61.

This result has a very useful corollary. Sub-diameter pre-filter 76 of FIG. 2 may easily be simulated by placing a full-aperture, iris diaphragm in front of full-aperture pre-filter 74 of FIG. 3. Such an iris diaphragm needs merely then to be opened ever-wider from some starting diameter, not less than the diameter of secondary mirror 52, in order to provide increasing illumination at ever-higher powers. Graduated, higher powers may be achieved by choosing a series of eyepieces 60 of stepwise decreasing focal length, i.e. of stepwise-increasing magnifying ability. If now, in addition, with each successive decrease in eyepiece focal length, each successive eyepiece is also stepped back a bit from the position of the eyepiece preceding it—that is, if, for each eyepiece, $\epsilon$ is stepwise made smaller—then F will automatically be forced to increase, via a change in mirror separation, in order to produce, through forcing lens $L_f$, a focused image at the field stop of each eyepiece in the series. But this circumstance of stepwise increased F and stepwise increased entrance-pupil size is the exactly condition that insures constant, high, image contrast through narrow-band filter 70 for each eyepiece. Throughout the series, the same, high focal-ratio is maintained. If an eyepiece-wheel is now constructed for the eyepieces in the series, and the rotation of this eyepiece-wheel is coordinated with a graduated series of pre-filters and with mirror separation, then a stepwise-zoom, constant-contrast, solar monochromator is at once constructed.

Figures 13, 14:
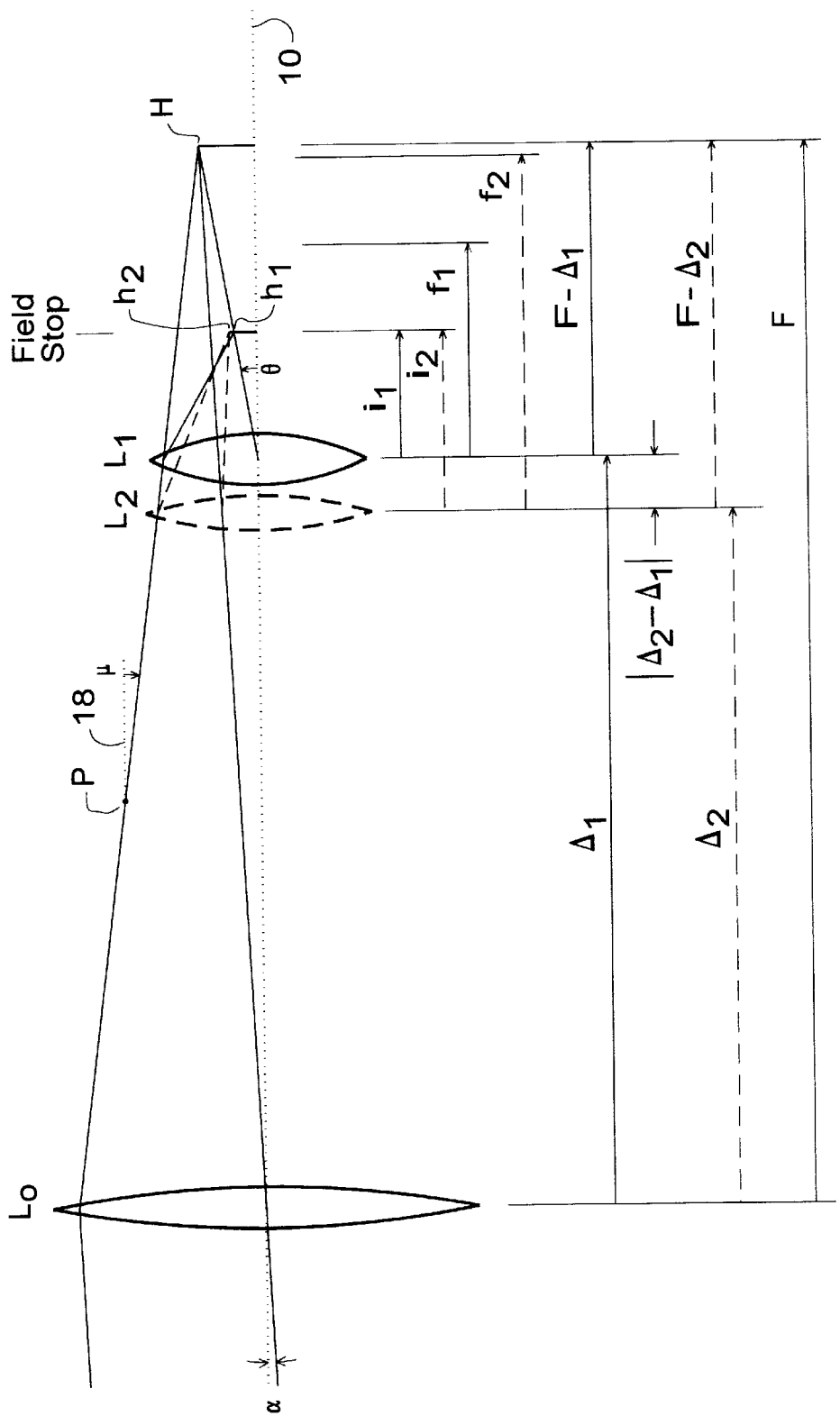
FIG. 13 is a thin-lens, schematic representation of the converging, optical element of present invention and of the telescopic component of the optical system shown in FIG. 6.
FIG. 14 is an identity.

FIG. 13 is a schematic, thin-lens representation of the optical system shown in FIG. 6, absent filter 70 and eyepiece 60. Thin-lens focal length F, attributed to surrogate thin-lens $L_0$, is the focal length that would allow $L_0$ to form an image of height H above axis 10 for rays entering the system at some angle $\alpha$, which height H is the same as the height of the image that the optical system shown in FIG. 6 also would form, were forcing lens $L_f$ to be removed, for rays entering at the same angle $\alpha$. Since we do not assume any particular, two-mirror, telescope design, and therefore cannot know the optimum, optical prescription for its associated forcing lens, a thin-lens approximation becomes appropriate as our general, first-order model. Thin-lens surrogate $L_1$ for forcing lens $L_f$ has focal length $f_1$, and is placed a distance $\Delta_1$ from lens $L_0$, forming an image of height $h_1$ at distance $i_1$ from its principal plane. For FIG. 13 to be a thin-lens approximation, each lens is assumed to have only one principal plane, located at its center. For a two-mirror telescope, the quantity $\Delta$ will of necessity be fictitious, although the quantity $F-\Delta$ will correspond to a real distance.

The point P in FIG. 13 is an arbitrary point on a particular light-ray subsequent to that ray's passage through lens $L_0$. Line 18 is drawn through point P, and parallel to axis 10. $\mu$ is the angle, measured positive for counterclockwise and negative for clockwise rotation, between line 18 and the particular light-ray. The tangent of $\mu$ defines the light-ray's slope. Here $-90° < \mu < 0°$, and so the slope (tan $\mu$) of the light-ray at point P is also negative.

We assume that F has been judged to be satisfactorily long and, therefore, that it is fixed: image contrast has been judged to be high. Also fixed are $f_1$ and $\Delta_1$. We place a field stop, or CCD chip, at the image plane, a distance $i_1$ from $L_1$. From FIG. 13, we have the following relations:

$$\frac{H}{F} = \tan\alpha, \tag{1}$$

$$\frac{H}{F - \Delta_1} = \tan\theta, \tag{2}$$

and $$\frac{h_1}{i_1} = \tan\theta. \tag{3}$$

Setting (3) equal to (2) yields $$h_1 = i_1 \frac{H}{F - \Delta_1}. \tag{4}$$

Solving (1) for H and substituting yields $$h_1 = i_1 \frac{F}{F - \Delta_1} \tan\alpha. \tag{5}$$

The thin-lens formula relates the object and image distances for $L_1$ as follows:

$$\frac{1}{f_1} = \frac{1}{i_1} + \frac{1}{-(F - \Delta_1)}, \tag{6}$$

where the object distance $(F-\Delta_1)$ is preceded by a minus sign to indicate that the object of lens $L_1$ is virtual. Transposing terms, combining, and inverting yields $$i_1 = \frac{f_1(F - \Delta_1)}{F + f_1 - \Delta_1}, \tag{7}$$

which may be rewritten for $\Delta_1$ to yield $$\Delta_1 = F - \frac{f_1 i_1}{f_1 - i_1} \text{ (shown in Fig. 15).} \tag{8}$$

We now ask the question: where should converging lens $L_2$ (shown dashed), with focal length $f_2$ different from $f_1$, be placed, so that the image formed by $L_2$ also lies at the field stop of the eyepiece/on the CCD chip, given that the system-image plane remains fixed in position relative to $L_0$? This parfocal condition (shown in FIG. 14) may be expressed as $$\Delta_1 + i_1 = \Delta_2 + i_2 \equiv k. \tag{9}$$

Thus, $$i_2 = k - \Delta_2. \tag{10}$$

Rewriting (7) for $i_2$ and combining with (10) yields $$k - \Delta_2 = \frac{f_2(F - \Delta_2)}{F + f_2 - \Delta_2}. \tag{11}$$

Clearing denominators, multiplying terms, simplifying, and regrouping yields a quadratic in $\Delta_2$:

$$\Delta_2^2 + (-1)(k+F)\Delta_2 + [kF + f_2(k-F)] = 0 \tag{12}$$

Applying the quadratic formula to (12) yields $$\Delta_2 = \frac{(k+F) \pm \{(k+F)^2 - 4[kF + f_2(k-F)]\}^{1/2}}{2}. \tag{13}$$

Simplifying the square root yields $$\Delta_2 = \frac{(k+F) - \{(k-F)(k-F-4f_2)\}^{1/2}}{2}. \tag{14}$$

In (14), the positive root has been discarded in order to keep the image plane, located at the field stop/CCD, inside the system, physically.

Rewriting (7) and (5) in terms of lens $L_2$ and combining yields $$h_2 = \frac{f_2(F - \Delta_2)}{F + f_2 - \Delta_2} \cdot \frac{1}{F - \Delta_2} \cdot F \tan\alpha. \tag{15}$$

Simplifying and substituting (14) for $\Delta_2$ yields, after additional simplifying, $$h_2 = \frac{2f_2 F \tan\alpha}{F + 2f_2 - k + \{(k-F)(k-F-4f_2)\}^{1/2}}. \tag{16}$$

Rewriting (15) for $h_1$, we have $$h_1 = \frac{Ff_1 \tan\alpha}{F + f_1 - \Delta_1}, \tag{17}$$

Multiplying (17) by the inverse of (16), we arrive at an expression (shown in FIG. 16) for the ratio of the heights $h_1$ and $h_2$:

$$\frac{h_1}{h_2} = \frac{1}{2} \cdot \frac{f_1}{f_2} \cdot \left[\frac{F + 2f_2 - k + \{(k-F)(k-F-4f_2)\}^{1/2}}{F + f_1 - \Delta_1}\right] \tag{18}$$

For the ratio of the height H in the focal plane of $L_0$ to the height h at the field stop/CCD, we first write (16) for a generic h and then divide by (1) solved for H, with the following result (shown in FIG. 17):

$$\frac{h}{H} = \frac{2f}{F + 2f - k + \{(k-F)(k-F-4f_2)\}^{1/2}}. \tag{19}$$

Subtracting (8) from (14) we derive the separation $\Delta_2 - \Delta_1$ (shown in FIG. 18) of $L_1$ from $L_2$:

$$\Delta_2 - \Delta_1 = \frac{k - F - \{(k-F)(k-F-4f_2)\}^{1/2}}{2} + \frac{f_1 i_1}{f_1 - i_1}. \tag{20}$$

wherein $\Delta_2 - \Delta_1 < 0$ indicates that $L_2$ is farther from the image plane located at the field stop than lens $L_1$, in this parfocalized condition.

Combining (8) and (9) written generically yields an expression (shown in FIG. 19) for the system constant k:

$$k = F - \frac{i^2}{f - i}. \tag{21}$$

Since telescope 50 represents a class of telescopes, among which the optical formulae and manufacturing tolerances will vary considerably, empirical determination of F and i in specific cases may be the most efficient, and arguably the most accurate, method for obtaining numerical values. A forcing lens $L_f$ of known, positive f is mounted in fixed position with respect to an eyepiece, with the focal plane of forcing lens $L_f$ for an infinite object falling just behind the eyepiece's field stop. The distance i between this field stop and forcing lens $L_f$ is then measured with a dial-caliper. If $L_f$ is a thick lens, then the location of its principal planes will have to be obtained from the manufacturer, and distances will have to be measured from the principal plane closest to field stop 61. Filter 70 is now removed and replaced with an extension tube of equal length, and the telescope is directed at, say, the full moon without any pre-filter. The separation of primary mirror 51 from secondary mirror 52 is adjusted until an image of the moon comes into focus in the eyepiece. Forcing lens $L_f$ is now also removed, as is eyepiece 60. Some distance behind telescope 50 a reflex-camera back (camera less lens) is moved along axis 10 until an image of the moon comes into sharp focus on the camera's focusing screen. Film is then appropriately exposed and developed, and the diameter of the moon's image is measured on the negative using, say, a stereo microscope and calibrated stage. The moon's angular diameter being well known, the extended back focal length F can at once be calculated. From (21) k is determined, and from (9) $\Delta$ is determined.

If it is now desired to change the size of the image at field stop 61 without changing the mirror separation, an alternate forcing lens with a different focal-length f will be required. To compute the new value of f, the old, image size and the new, desired image size must be inserted in place of $h_1$ and $h_2$ in equation (18), along with F, k and $\Delta$, as determined, and the equation solved for the new f. The placement of the alternate forcing lens relative to the original forcing lens will then be given by equation (20).

Figure 21:
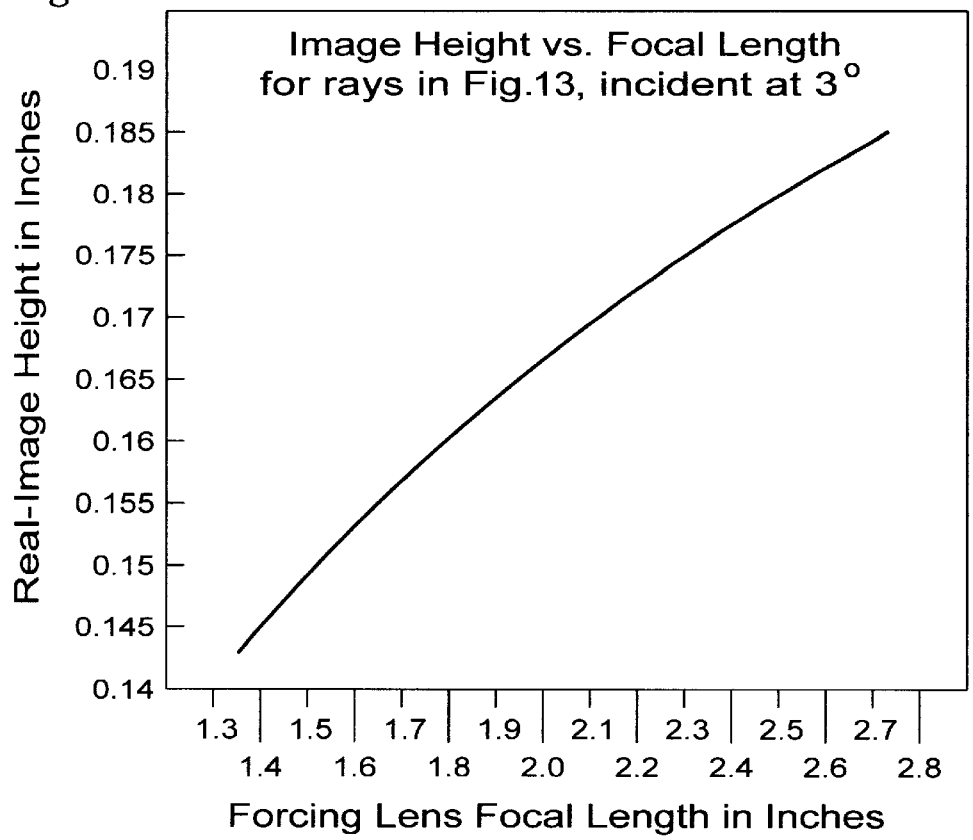
FIG. 21 is a graph.

FIG. 21 shows the actual variation of image height with focal length for the forcing lenses and the angle of entry (3°) of the rays shown in FIG. 13. The relationship is not far from linear over more than a doubling of focal length, and has a relatively shallow slope (note the compression of the horizontal axis). Real-image size may thus be easily adjusted. The utility of this feature will become apparent, below.

If telescope 50 is assumed to be optimally corrected at its conventional focal plane (optimal image correction, as determined by the telescope manufacturer, generally may be taken to define the conventional focal plane) for both the longitudinal and transverse components of spherical aberration, astigmatism and field curvature, and for axial and lateral chromatic aberration, as well as for coma and distortion, then it is also clear that, as a result of altering the separation of mirrors 51 and 52 in order to extend the focal plane backwards, this optimal correction will no longer characterize the image formed at the unconventional, extended back focus. Although, in the present invention, no real image actually is allowed to form at the extended back focus, the beam of light that would form such an image is nonetheless exploited, in that it is sent through filter 70. The question therefore arises, how many optical, degrees of freedom must forcing lens $L_f$ minimally have in order to be able to reoptimize image quality, this time at the new system focal plane, namely at field stop 61?

It is worth noting here that not all aberrations worsen with an extension of back focus. The "standard-design forms" of pure, two-mirror telescopes, for example, do not show a dependence of third-order, transverse, spherical aberration on back-focus position (see *Modern Optical Engineering*, op. cit., pp. 442–443). Furthermore, the linear extent of the aberrations in the real, reduced-size image at field stop 61 will be significantly less than these same aberrations' linear extent in the virtual object of forcing lens $L_f$. Their ratio, in fact, will be just h/H, given in equation (19) and in FIG. 17, inasmuch as the converging beam of light that is responsible for both the real image and for its virtual object contains just the one set of angular departures from the optimum focus (assuming no contributions from forcing lens $L_f$ itself). In practice, using a 89 mm Maksutov telescope of 1208 mm conventional focal length, and with a 100 mm forcing lens placed 82.2 mm from field stop 61, the ratio h/H is 1/5.9 (the extended back focus is 3528 mm!). As long as the sub-optimal correction of the virtual object of forcing lens $L_f$ is not substantial—and in practice with high-end telescopes this generally is the case—then the aberrational defects in the real image will not only remain quite small in linear extent, they will generally go unnoticed, even through very short-focal length eyepieces.

Figure 20:
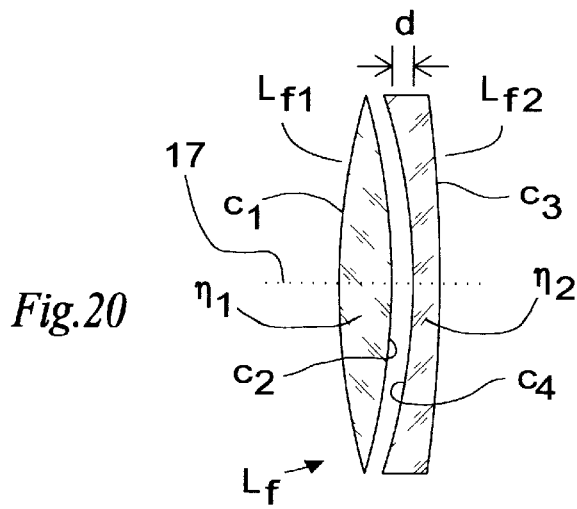
FIG. 20 is a cross-sectional view of lens elements, taken in a plane containing their mutual, optical axis.

Since no correction will be required for either axial or lateral chromatic aberration, the virtual object being monochromatic, it may well seem that a singlet lens could always be made to work reasonably well as a forcing lens, its third degree of freedom being used to balance the system aberrations. This isn't the case, however. Singlet lenses are always undercorrected for spherical aberration (*Modern Optical Engineering*, op. cit., p.71), and yet it may well be necessary, depending upon the particular optical formula of the particular member of the class of telescopes in question, to offset an undercorrected, third- or fifth-order, spherical aberration in the virtual object of forcing lens $L_f$. Such a circumstance will of necessity require the use of a forcing lens overcorrected for spherical aberration, which a singlet lens, however, cannot be. Thus, singlets reveal themselves to be ill-suited to optimizing the entire system, notwithstanding the monochromatic environment. Optimization thus requires at least a doublet, as shown in FIGS. 6, 11, 12, 22 and 23, and as shown more generally in FIG. 20. Forcing lens $L_f$ in FIG. 20 has elements $L_{f1}$ and $L_{f2}$ sharing optical axis 17 and has a total of seven degrees of freedom: curvatures $C_1$ and $C_2$ and refractive index $\eta_1$ of $L_{f1}$; curvatures $C_3$ and $C_4$ and refractive index $\eta_2$ of $L_{f2}$; and air gap d between them. With a forth degree of freedom used to control system, spherical aberration, a fifth degree of freedom to guarantee that the object and image points $-(F-\Delta)$ and f are truly conjugate (as implied by equation (4)), the sixth and seventh degrees of freedom will be left to balance, as needed, field curvature, distortion and coma. Thus, a high level of optimization of the overall system, suited to a professional environment, may be achieved with a forcing lens having at least six, and preferably having seven, optical degrees of freedom.

For amateur observers, a high-quality, cemented achromat, optimized for an infinite conjugate ratio will generally work quite well as a forcing lens, as experiment with a commercial-grade, catadioptric telescope indeed confirms.

Figure 22:
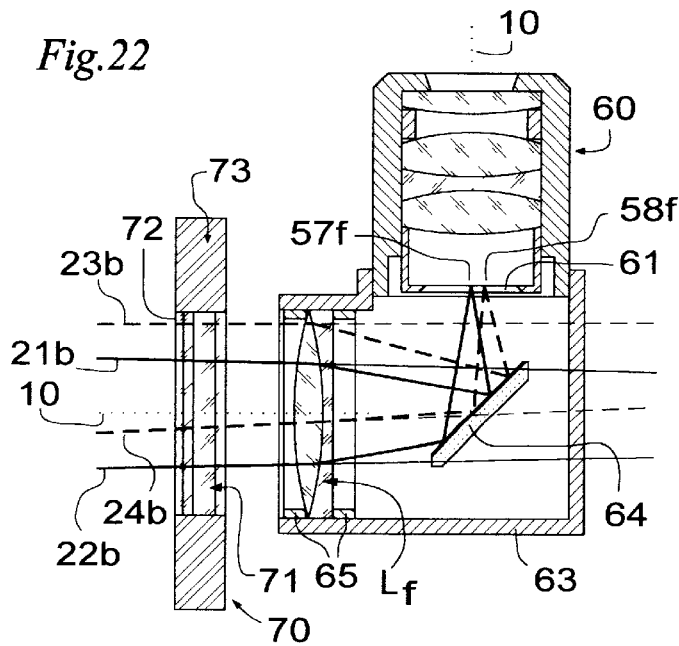
FIG. 22 is a cross-sectional view of a second embodiment of the present invention with the same, adjacent optical elements as shown in FIG. 11.

FIG. 22 is an alternate embodiment of the present invention, identical to the embodiment shown in FIG. 11, except that first-surface, optical flat 64 redirects optical axis 10, and hence converging rays 21*b*, 22*b*, 23*b*, and 24*b* (shown bold), in order to make viewing more comfortable.

Figure 23:
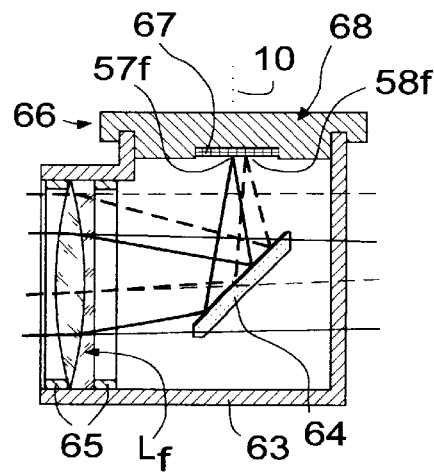
FIG. 23 is a cross-sectional view of a third embodiment of the present invention.

FIG. 23 is yet another embodiment of the present invention, identical to the embodiment shown in FIG. 22, except that eyepiece 60 has been replaced by CCD unit 66, comprising CCD chip 67 and housing 68, which in turn comprises the various electronics is associated with the proper functioning of chip 67.

Figure 24:
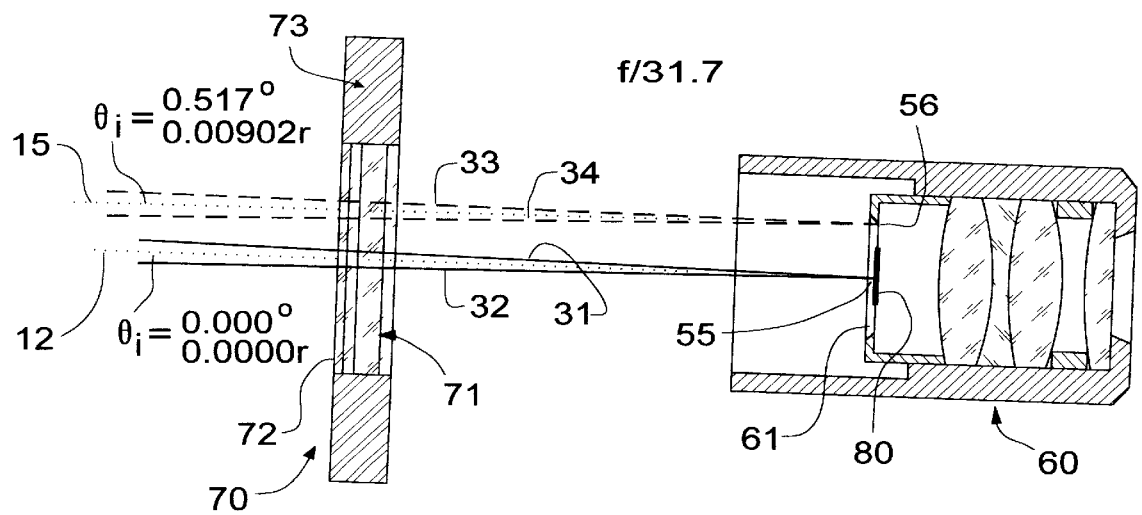
FIG. 24 is a cross-sectional view of a portion of FIG. 1 in the same plane and showing an additional, off-axis point in the conventional focal plane.

FIG. 24 shows a portion of FIG. 1, but with the addition of sample rays 33 and 34, incident on pre-filter 75 near its periphery and at the same points as sample rays 31 and 32, respectively. The angle of incidence of rays 33 and 34 is 0.5° with respect to the normal to pre-filter 75, that is to axis 11, these rays having originated from points on the sky approximately one solar radius from the sun's limb. An image 80 of the whole solar disk is formed at field stop 61. Telescope 50 bends sample rays 31 and 32 such that they form a cone of light, having axis 12, that converges to axial focal point 55 at field stop 61 after passing through filter-stack 71. Sample rays 33 and 34 are likewise bent such that they form a cone of light, now with axis 15. This latter cone converges, however, to off-axial focal point 56 at field stop 61 after passing through filter-stack 71. Filter 70 and eyepiece 60 remain coaxial with axis 12, and tilted such that axis 12 is normal to filter-stack 71, as in FIG. 1. This reduced-aperture configuration once offered the highest-contrast, full-disk views of the sun and prominences generally obtained with two-mirror telescopes equipped with Fabry-Perot, etalon-type, interference filters (see U.S. Pat. No. 3,580,679).

Axis 15, unlike axis 12, is not normal to filter-stack 71. This may be easily appreciated by tracing axis 15 from off-axial focal point 56 forward to the center of the front surface of pre-filter 75, from which point axis 15 originates, and from which point also, however, axis 12 originates. Axis 15 thus slopes with respect to axis 12, and so cannot be normal to filter-stack 71. The actual angle of incidence $\theta_i$ of axis 15 is 0.517° or 0.00902r (radians), as measured on this computer-drawn, f/31.7, off-axis pre-filter system.

Figure 25:
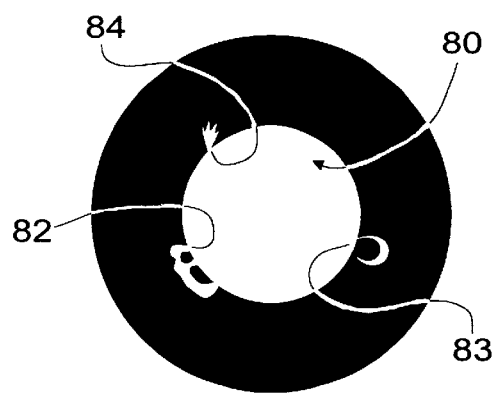
FIG. 25 is a view of the sun as seen through the eyepiece of any one the optical systems shown in FIGS. 1, 2, or 3.
Figure 26:
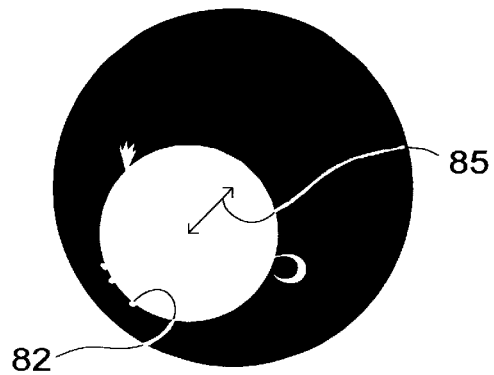
FIG. 26 is a view of the sun as seen through the eyepiece of any one the optical systems shown in FIGS. 1, 2, or 3 but displaced with respect to the center of the field of view.

FIG. 25 shows solar disk 80, as seen centered in eyepiece 60 of FIG. 24, showing hedgerow prominence 82, loop prominence 83, and surge prominence 84, at the solar limb. FIG. 26 shows the same prominences, only now disk 80 has been displaced by some angular amount 85 on the sky with respect to telescope axis 10. Such a displacement can easily occur, if telescope 50 drifts during tracking, or if an observer—perhaps one of a line of students waiting to view through a portable telescope—inadvertently nudges it. The sun's image, because of this displacement, has been carried quite near to the edge of the field of view. We note that hedgerow prominence 82 has all but disappeared, although it still ought to fit within the eyepiece field. The next observer may reasonably wonder, what on earth (on the sun!) she is supposed to be observing.

FIG. 32 compares the broad, disk, Hα, absorption-line profile to a typical, Hα, prominence, emission-line profile. The prominence, emission-line profile, although Gaussian, due to Doppler broadening, is much narrower than the absorption-line profile and has only 10% the intensity of the continuum emission at the center of the absorption line. The emission-line's half-intensity points, both toward the blue wing and the red wing of its rest, Hα wavelength, are symbolically marked.

Below FIG. 32, and in wavelength registry with it, is FIG. 34, showing the transmission profile of an actual, narrow-band, Fabry-Perot, etalon-type interference filter (solid-line profile) in collimated light normally incident on the filter stack. For collimated light incident at a small angle $\theta_i$ on the filter-stack, there will be a shift $\Delta\lambda$ in the peak wavelength $\lambda$ of the transmission profile. This shift is given by the equation shown in FIG. 33, where $\eta$ is the refractive index of the etalon (about 1.57 for mica). The equation in FIG. 33 may be found in *The Effect of Telecentric Use of Narrow-Band Filters on Diffraction Limited Imaging*, op.cit., p.1, as well as in column 4, line 35 of U.S. Pat. No. 5,125,743.

Although a cone of light, however narrow, only approximates collimated light, these profiles do serve to illustrate an important point. The half-intensity points of the prominence emission line, which fall symmetrically on either side of the unshifted, filter, transmission profile and at a high level of transmittance relative to the peak transmittance, fall entirely on one side of the shifted profile (shown dashed), and at diminished levels of transmittance. The narrower the filter profile, the more pronounced this effect will be. As transmissivity with respect to the prominence emission line attenuates, due to shifts of the filter transmission profile, the more deprived of light, i.e. the fainter, the prominence image will become. For non-collimated light arriving in a converging cone, where the axis of the cone is not normally incident upon the filter stack, there will be rays, such as ray 34 in FIG. 24, whose angles of incidence are high-enough to shift their contributions to the image-point so far into the wings of the prominence emission line, that, in effect, they will contribute no light to the image-point whatsoever. The present invention, by narrowing very greatly all of the cones of light passing through filter-stack 71 (see FIG. 11), also greatly diminishes the angles of incidence for all of the rays within each cone. The filter profile shifts very much less over the entire field of view, relative to the shifts encountered over the same field at the conventional focus. Thus, the same angular displacement on the sky of the emitting source results in far less loss of light in the image of the source.

The disappearance of prominences near the edge of the field, as in FIG. 26, is often exacerbated by image degradation occurring within eyepiece 60 itself. "The [eyepiece] designer," writes Warren Smith in *Modern Optical Engineering* (op. cit., p. 404), has "to use extreme care with regard to coma, distortion, lateral color, astigmatism, and curvature of field; the first three mentioned can become unusually difficult . . . Typically an eyepiece is fairly well corrected for coma for one zone of the field . . . the function of the outer portions of the field of view is to orient the user and to locate objects which are then brought to the center of the field for more detailed examination." A "best" zone—apart from the "perfect" paraxial zone—in which aberrations are collectively minimized, commonly is located, with respect to the center of the field of view, at a distance equal to 0.707 times the radius of the field stop, since, at this radius, the field will be divided into equal areas (0.707 being just the square root of ½). By drifting near to the edge of the field, the image of prominence 82 has not only lost light, as just described, it has also entered an often-rather poorly corrected zone of eyepiece 60, degrading yet further. The ability of the present invention, by means of equations (18) and (20), shown in FIGS. 16 and 18, respectively, to adjust the height h of an image located at field stop 61 of eyepiece 60 permits this problem to be remedied.

Figure 27:
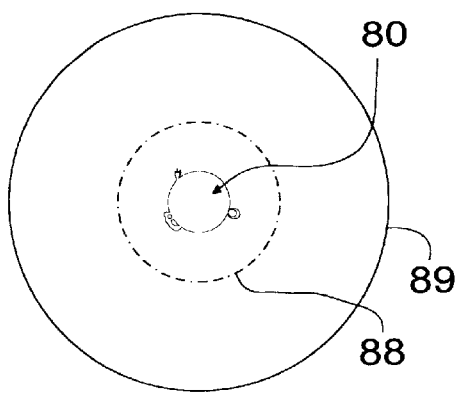
FIG. 27 is a schematic view of the sun in the focal plane of the present invention.
Figure 28:
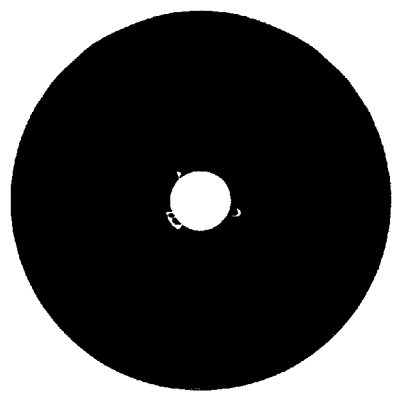
FIG. 28 is a view of the sun in the focal plane of the present invention.

FIG. 27 shows, schematically, the image plane formed by forcing lens $L_f$, including solar disk 80, edge 88 of the widest telescope field, and edge 89 of the widest, standard-eyepiece, field stop. Telescope 50 generally will contain some internal stop, such as perforation 59 of primary mirror 51, that will limit the angular diameter of the area on the sky from which rays will be allowed to proceed through the telescope. If eyepiece 60 is removed, and filter 70 is also removed and replaced by an extension tube of equal length, and a ground glass is placed at the focus of forcing lens $L_f$, and telescope 50 is then aimed a bright patch of sky (away from the sun!), edge 88 of this widest telescopic field will become immediately apparent. Outside edge 88 the ground glass will remain dark. The edge 89 of the widest possible field stop 61 for a standard eyepiece will be determined by the diameter of the particular telescope's drawtube, by the machining of the telescope's standard eyepieces, as well as by the longest, standard-eyepiece focal length, etc. If, now, filter 70 is replaced, and telescope 50 is directed at the sun, a small solar image will appear on the otherwise-dark ground glass, as shown in FIG. 28.

Figure 29:
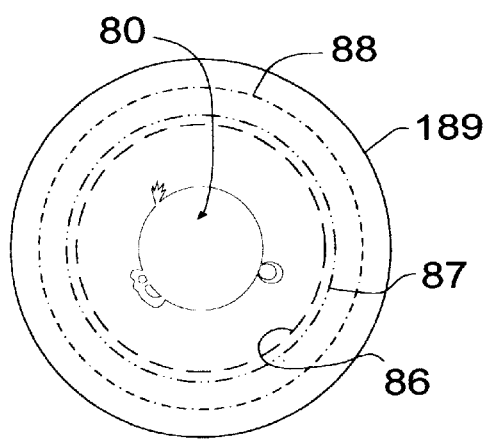
FIG. 29 is a schematic view of the sun as seen through the eyepiece of the optical system shown in FIG. 6.
Figure 30:
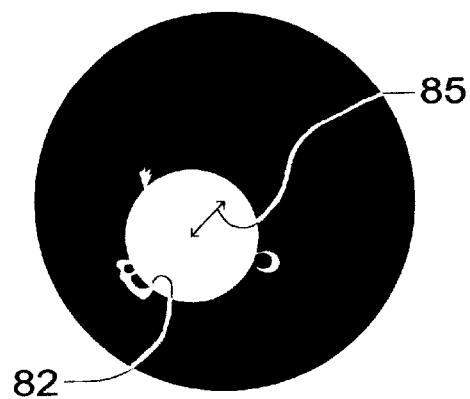
FIG. 30 is a view of the sun as seen through the eyepiece of the optical system shown in FIG. 6, but displaced with respect to the center of the field of view by an angular amount on the sky equal to the displacement in FIG. 26.

Eyepiece 60 may now also be replaced and the sun's image brought to the center of the field. FIG. 29 shows, schematically, circle 86, distant one solar radius from the edge of solar disk 80, circle 87, whose radius is 0.707 times the radius of particular edge 189 of the particular field stop of some particular eyepiece, and circle 88, the maximum telescopic field. By means of equations (18) and (20)—that is, by choosing an alternate forcing lens $L_f$ and by positioning it correctly—the solar-image size may now be adjusted until circle 86 coincides with circle 87. The region surrounding the sun into which prominences commonly extend and the zone of best correction of eyepiece 60 will be made to overlap. The resulting view is shown in FIG. 30. Again, telescope 50 has drifted during tracking or has been nudged, but now prominence 82, though displaced angularly as much as before with respect to the telescope axis, remains fully visible.

If circle 88, the maximum telescopic field, were made to coincide in this example with particular edge 189 of the particular field stop of some particular eyepiece instead, then the solar image would grow even larger, yet the zonal-overlap would still remain quite good.

In some limited circumstances, it may be possible to purchase an oversize eyepiece of suitably-long focal length and having a wide-enough field stop that the telescope's drawtube may actually be made to fit, physically, inside that field stop—opposite to the usual arrangement, wherein an eyepiece's barrel fits entirely within the telescope's drawtube. Under such circumstances, the zone of best correction of the eyepiece can more or less be brought into coincidence with circle 86 at the conventional focus of the telescope. However, oversize, long-focal length eyepieces usually are rather heavy and, applied in this manner, usually require adapters, which add more weight. Should the image-scale at the conventional focus of the telescope be fairly large, there may in fact be no eyepiece that is oversize enough to accommodate the entire solar disk, let alone the surrounding prominences. The high-power, image-contrast problem will, of course, also remain unsolved.

Figure 31:
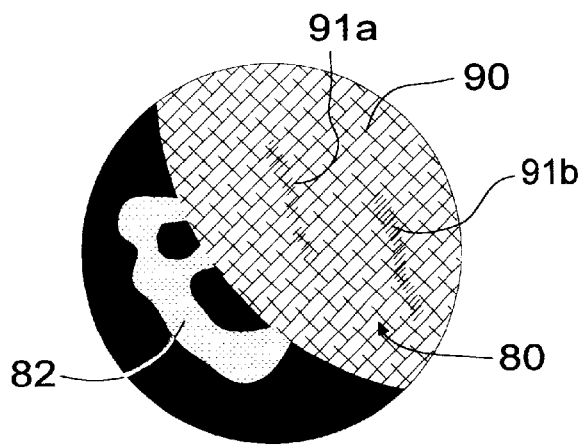
FIG. 31 is a view of the sun as seen through the eyepiece of the optical system shown in FIG. 6, but at a higher magnification than in FIG. 30.

FIG. 31 shows a portion of solar disk 80 as seen through the present invention, comprising, in this instance, an especially short-focus, "high-power" eyepiece, plus a sub-diameter pre-filter, such as pre-filter 76 in FIG. 2, plus the forcing lens. Solar surface 90 shows a wealth of mottled, Hα detail, simulated here by the hatching pattern, plus chromospheric filament 91*b*. To convey a sense of the improvement brought about by the present invention, the same filament is shown at 91*a*, approximately as it would appear in the eyepiece of the optical arrangement shown in FIG. 2, that is, without the present invention in place. Although filament 91*a* does remain visible, its contrast with respect to the surrounding, solar disk is far less marked. The image is "muddy." Too much light from the continuum has been allowed to flood the image, washing out contrast. The present invention reinstates this lost chiaroscuro.

I claim:

1. A optical system comprising:
    a means capable of forming an image, said means having an entrance pupil through which a beam of light enters said optical system, said means further having two mirrors, the first of said mirrors intercepting said beam of light and causing it to converge, the first of said mirrors further having a perforation, the second of said mirrors directing said converging beam of light from said first mirror toward said perforation in said first mirror, said converging beam of light passing through said perforation and emerging on the side of said first mirror farthest from said second mirror, said emerging, converging beam of light having an axis, and a filter characterized by a dependence on the angle of incidence of said axis of said emerging, converging beam of light upon said filter of the wavelengths of light transmitted by said filter from among the constituent wavelengths of said emerging, converging beam of light and a converging lens, said optical system being so arranged that said emerging, converging beam of light is incident upon said filter before said light transmitted by said filter passes through said converging lens, said converging lens forming a real image by directing said light transmitted by said filter to a focus, and said means capable of forming an image forming, however, no real image before said light transmitted by said filter passes through said converging lens.

2. An optical system as set forth in claim 1 wherein said means capable of forming an image has an optical axis and a conventional focal ratio, said conventional focal ratio corresponding to a conventional slope for light rays entering said means capable of forming an image parallel to said optical axis and from the periphery of said entrance pupil and converging thereafter to a focus on said optical axis following reflection from both said mirrors, and wherein said first and second mirrors are a distance apart and said distance apart is adjustable, and wherein the maximum, absolute value of the slopes of the rays constituting said emerging, converging beam of light at their respective points of incidence upon said filter is substantially less than the absolute value of said conventional slope, said maximum absolute value thus corresponding to a focal ratio substantially larger than said conventional focal ratio, said substantially larger focal ratio being obtained by adjusting said distance apart of said mirrors.

3. An optical system as set forth in claim 2 wherein said converging lens has a focal length f for an infinite object, and in which said converging lens is a distance i from said real image formed by said converging lens, said distance i being less than said focal length f by an amount $\epsilon$, and in which said substantially larger focal ratio approaches infinity as $\epsilon$ approaches zero from above.

4. An optical system as set forth in claim 1 wherein said means capable of forming an image is a catadioptric telescope.

5. An optical system as set forth in claim 4 wherein said catadioptric telescope is a variety of Maksutov-Cassegrain telescope.

6. An optical system as set forth in claim 4 wherein said catadioptric telescope is a variety of Schmidt-Cassegrain telescope.

7. An optical system as set forth in claim 1 wherein full specification of said converging lens requires specification of at least six, optical degrees of freedom.

8. An optical system as set forth in claim 1 wherein said converging lens may be exchanged for an alternate converging lens, said converging lens and said alternate converging lens having different focal lengths, said alternate converging lens being positionable within said optical system such that the location of the real image formed by said alternate converging lens coincides with the location of the real image formed by said optical system prior to said exchange of said converging lenses.

9. An optical system as set forth in claims 2 and 8 wherein said substantially larger focal ratio corresponds to an unconventional focal length F for said means capable of forming an image divided by the diameter D of said entrance pupil of said optical system, and wherein said converging lens is specified in part by a focal length $f_1$ for an infinite object, said focal length $f_1$ being measured with respect to a principal plane of said converging lens, said converging lens being furthermore a distance $i_1$ from the image formed by said converging lens, said distance $i_1$ being measured with respect to said principal plane of said converging lens, and wherein said alternate converging lens is specified in part by focal length $f_2$ for an infinite object, said focal length $f_2$ measured with respect to a principal plane of said alternate converging lens, and wherein the position of said alternate converging lens in said optical system, measured with respect to said converging lens and said principal planes of said lenses, is given, to a first order approximation, by the formula $$\frac{k - F - \{(k - F)(k - F - 4f_2)\}^{1/2}}{2} + \frac{f_1 i_1}{f_1 - i_1},$$

wherein $$k = F - \frac{i_1^2}{f_1 - i_1},$$

and wherein a value of said formula of less than zero indicates that the distance of said alternate converging lens from said image plane of said optical system, as determined initially by said real image formed by said converging lens, is greater than $i_1$, as measured with respect to said principal plane of said alternate converging lens.

10. An optical system as set forth in claim 1 having a means for examining said real image produced by said converging lens.

11. An optical system as set forth in claim 10 wherein said means for examining said real image produced by said converging lens is an eyepiece.

12. An optical system as set forth in claim 10 wherein said means for examining said real image produced by said converging lens is a charge coupled device.

13. An optical system as set forth in claim 1 wherein said entrance pupil is defined by a broad-band filter.

14. An optical system as set forth in claim 13, but having a graduated plurality of said broad-band filters, each member of said plurality being of a different, graduated size, each said graduated size admitting a different, graduated amount of light into said optical system, said optical system further having a graduated plurality of means for examining said real image produced by said converging lens, each member of said graduated plurality of means for examining said real image having a different magnifying ability, each member of said first, graduated plurality being associated with a member of said second, graduated plurality such that the intensity of light per unit solid angle passing through each consecutive member of said second plurality is the same.

15. An optical system as set forth in claim 14 wherein said graduated plurality of said broad-band filters is formed by one broad-band filter and an iris diaphragm, said iris diaphragm closing to some smallest aperture which is smaller than said broad-band filter, yet which admits light from said broad-band filter into said optical system, and opening to some largest aperture, which is determined by the size of said broad-band filter.

16. An optical system as set forth in claims 2 and 14 wherein the distance from said converging lens of each member of said graduated plurality of means for examining said real image is stepwise varied, and wherein each step in said stepwise variation requires a change in said distance apart of said mirrors in order to bring into focus for each said member of said graduated plurality of means a real image for examination by each said member and wherein the image contrast of each said real image remains constant.

17. An optical system as set forth in claim 14 wherein said graduated plurality of said broad-band filters is replaced by a graduated plurality of aperture stops.

18. An optical system as set forth in claim 17 wherein said graduated plurality of aperture stops is effected by an iris diaphragm.

19. An optical system as set forth in claims 2 and 17 wherein the distance from said converging lens of each member of said graduated plurality of means for examining said real image is stepwise varied, and wherein each step in said stepwise variation requires a change in said distance apart of said mirrors in order to bring into focus for each said member of said graduated plurality of means a real image for examination by each said member and wherein the image contrast of each said real image remains constant.

* * * * *